United States Patent
Zhang et al.

(10) Patent No.: US 11,606,746 B2
(45) Date of Patent: Mar. 14, 2023

(54) MULTIPLE SELECTED/DESELECTED CELLS FOR LAYER 1/LAYER 2 BASED MOBILITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/949,536

(22) Filed: Nov. 2, 2020

(65) Prior Publication Data

US 2021/0195512 A1 Jun. 24, 2021

Related U.S. Application Data

(60) Provisional application No. 62/967,305, filed on Jan. 29, 2020, provisional application No. 62/952,900, filed on Dec. 23, 2019.

(51) Int. Cl.
*H04W 48/20* (2009.01)
*H04W 48/16* (2009.01)
(Continued)

(52) U.S. Cl.
CPC .......... *H04W 48/20* (2013.01); *H04W 48/16* (2013.01); *H04W 72/1289* (2013.01); *H04W 76/11* (2018.02); *H04W 76/27* (2018.02)

(58) Field of Classification Search
CPC ..... H04W 76/11; H04W 48/10; H04W 48/20; H04W 48/16; H04W 72/1289; H04W 76/27; H04W 36/00835; H04W 36/0061
See application file for complete search history.

(56) References Cited

U.S. PATENT DOCUMENTS

| 2014/0128074 A1* | 5/2014 | Vangala | H04W 36/22 455/436 |
| 2019/0281510 A1 | 9/2019 | Yilmaz et al. | |

(Continued)

FOREIGN PATENT DOCUMENTS

WO 2019062307 A1 4/2019

OTHER PUBLICATIONS

CMCC: "On Multi-Beam-Based Mobility Management", 3GPP Draft, R1-1609310, 3GPP TSG RAN WG1 Meeting #86bis, 3rd Generation Partnership Project (3GPP), Mobile Competence Centre, 650, Route Des Lucioles, F-06921 Sophia-Antipolis Cedex, France, vol. RAN WG1. No. Lisbon. Portugal, Oct. 10, 2016-Oct. 14, 2016, Oct. 9, 2016 (Oct. 9, 2016), XP051149355, 5 Pages, Retrieved from the Internet: URL:http://www.3gpp.org/ftp/Meetings_3GPP_SYNC/RAN1/Docs/ [retrieved on Oct. 9, 2016] p. 3, Last Paragraph.

(Continued)

*Primary Examiner* — Diane D Mizrahi
(74) *Attorney, Agent, or Firm* — Harrity & Harrity, LLP

(57) ABSTRACT

Various aspects of the present disclosure generally relate to wireless communication. In some aspects, a first wireless communication device may identify a plurality of cells associated with serving a user equipment (UE), where each cell of the plurality of cells has been either selected for serving the UE or deselected for serving the UE. The first wireless communication device may transmit an indication of the plurality of cells associated with serving the UE to a second wireless communication device, where the indication includes information indicating whether each cell of the plurality of cells has been selected for serving the UE or has been deselected for serving the UE. Numerous other aspects are provided.

30 Claims, 10 Drawing Sheets

(51) Int. Cl.
*H04W 72/12* (2009.01)
*H04W 76/27* (2018.01)
*H04W 76/11* (2018.01)

(56) References Cited

U.S. PATENT DOCUMENTS

2020/0288390 A1     9/2020   Wang et al.
2021/0250825 A1*   8/2021   Purkayastha ..... H04W 36/0077

OTHER PUBLICATIONS

International Search Report and Written Opinion—PCT/US2020/070739—ISA/EPO—dated Feb. 15, 2021.

\* cited by examiner

MULTIPLE SELECTED/DESELECTED CELLS FOR LAYER 1/LAYER 2 BASED MOBILITY

CROSS-REFERENCE TO RELATED APPLICATIONS

This Patent Applications claims priority to U.S. Provisional Patent Application No. 62/952,900, filed on Dec. 23, 2019, entitled "MULTIPLE SELECTED/DESELECTED CELLS FOR LAYER 1/LAYER 2 BASED MOBILITY," and assigned to the assignee hereof, and to U.S. Provisional Patent Application No. 62/967,305, filed on Jan. 29, 2020, entitled "MULTIPLE SELECTED/DESELECTED CELLS FOR LAYER 1/LAYER 2 BASED MOBILITY," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for multiple selected/deselected cells for layer 1 (L1)/layer 2 (L2) based mobility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first wireless communication device, may include identifying a plurality of cells associated with serving a UE, wherein each cell of the plurality of cells has been either selected for serving the UE or deselected for serving the UE; and transmitting an indication of the plurality of cells associated with serving the UE to a second wireless communication device, wherein the indication includes information indicating whether each cell of the plurality of cells has been selected for serving the UE or has been deselected for serving the UE.

In some aspects, a method of wireless communication, performed by a first wireless communication device, may include identifying a plurality of cell groups associated with serving a UE, wherein each cell group of the plurality of cell groups has been either selected for serving the UE or deselected for serving the UE; and transmitting an indication of the plurality of cell groups associated with serving the UE to a second wireless communication device, wherein the indication includes information indicating whether each cell group of the plurality of cell groups has been selected for serving the UE or has been deselected for serving the UE.

In some aspects, a first wireless communication device for wireless communication may include memory and one or more processors operatively coupled to the memory. The memory and the one or more processors may be configured to identify a plurality of cells associated with serving a UE, wherein each cell of the plurality of cells has been either selected for serving the UE or deselected for serving the UE; and transmit an indication of the plurality of cells associated with serving the UE to a second wireless communication device, wherein the indication includes information indicating whether each cell of the plurality of cells has been selected for serving the UE or has been deselected for serving the UE.

In some aspects, a first wireless communication device for wireless communication may include memory and one or more processors operatively coupled to the memory. The memory and the one or more processors may be configured to identify a plurality of cell groups associated with serving a UE, wherein each cell group of the plurality of cell groups has been either selected for serving the UE or deselected for serving the UE; and transmit an indication of the plurality of cell groups associated with serving the UE to a second wireless communication device, wherein the indication includes information indicating whether each cell group of the plurality of cell groups has been selected for serving the UE or has been deselected for serving the UE.

In some aspects, a non-transitory computer-readable medium may store one or more instructions for wireless communication. The one or more instructions, when executed by one or more processors of a first wireless communication device, may cause the one or more processors to: identify a plurality of cells associated with serving a UE, wherein each cell of the plurality of cells has been either selected for serving the UE or deselected for serving the UE; and transmit an indication of the plurality of cells associated with serving the UE to a second wireless communication device, wherein the indication includes information indicating whether each cell of the plurality of cells has been selected for serving the UE or has been deselected for serving the UE.

In some aspects, a non-transitory computer-readable medium may store one or more instructions for wireless communication. The one or more instructions, when executed by one or more processors of a first wireless communication device, may cause the one or more processors to: identify a plurality of cell groups associated with serving a UE, wherein each cell group of the plurality of cell groups has been either selected for serving the UE or deselected for serving the UE; and transmit an indication of the plurality of cell groups associated with serving the UE to a second wireless communication device, wherein the indication includes information indicating whether each cell group of the plurality of cell groups has been selected for serving the UE or has been deselected for serving the UE.

In some aspects, an apparatus for wireless communication may include means for identifying a plurality of cells associated with serving a UE, wherein each cell of the plurality of cells has been either selected for serving the UE or deselected for serving the UE; and means for transmitting an indication of the plurality of cells associated with serving the UE to a wireless communication device, wherein the indication includes information indicating whether each cell of the plurality of cells has been selected for serving the UE or has been deselected for serving the UE.

In some aspects, an apparatus for wireless communication may include means for identifying a plurality of cell groups associated with serving a UE, wherein each cell group of the plurality of cell groups has been either selected for serving the UE or deselected for serving the UE; and means for transmitting an indication of the plurality of cell groups associated with serving the UE to a wireless communication device, wherein the indication includes information indicating whether each cell group of the plurality of cell groups has been selected for serving the UE or has been deselected for serving the UE.

In some aspects, a method of wireless communication performed by a second wireless communication device includes receiving an indication of a plurality of cells associated with serving a UE from a first wireless communication device, wherein the indication includes information indicating whether each cell of the plurality of cells has been selected for serving the UE or has been deselected for serving the UE; and updating a list of serving cells of the UE based at least in part on the indication.

In some aspects, a method of wireless communication performed by a second wireless communication device includes receiving an indication of a plurality of cell groups associated with serving a UE from a first wireless communication device, wherein the indication includes information indicating whether each cell group of the plurality of cell groups has been selected for serving the UE or has been deselected for serving the UE; and updating a list of serving cell groups of the UE based at least in part on the indication.

In some aspects, a second wireless communication device for wireless communication includes a memory and one or more processors operatively coupled to the memory, the memory and the one or more processors configured to receive an indication of a plurality of cells associated with serving a UE from a first wireless communication device, wherein the indication includes information indicating whether each cell of the plurality of cells has been selected for serving the UE or has been deselected for serving the UE; and update a list of serving cells of the UE based at least in part on the indication.

In some aspects, a second wireless communication device for wireless communication includes a memory and one or more processors operatively coupled to the memory, the memory and the one or more processors configured to receive an indication of a plurality of cell groups associated with serving a UE from a first wireless communication device, wherein the indication includes information indicating whether each cell group of the plurality of cell groups has been selected for serving the UE or has been deselected for serving the UE; and update a list of serving cell groups of the UE based at least in part on the indication.

In some aspects, a non-transitory computer-readable medium storing a set of instructions for wireless communication includes one or more instructions that, when executed by one or more processors of a second wireless communication device, cause the wireless communication device to receive an indication of a plurality of cells associated with serving a UE from a first wireless communication device, wherein the indication includes information indicating whether each cell of the plurality of cells has been selected for serving the UE or has been deselected for serving the UE; and update a list of serving cells of the UE based at least in part on the indication.

In some aspects, a non-transitory computer-readable medium storing a set of instructions for wireless communication includes one or more instructions that, when executed by one or more processors of a second wireless communication device, cause the wireless communication device to receive an indication of a plurality of cell groups associated with serving a UE from a first wireless communication device, wherein the indication includes information indicating whether each cell group of the plurality of cell groups has been selected for serving the UE or has been deselected for serving the UE; and update a list of serving cell groups of the UE based at least in part on the indication.

In some aspects, an apparatus for wireless communication includes means for receiving an indication of a plurality of cells associated with serving a UE from a wireless communication device, wherein the indication includes information indicating whether each cell of the plurality of cells has been selected for serving the UE or has been deselected for serving the UE; and means for updating a list of serving cells of the UE based at least in part on the indication.

In some aspects, an apparatus for wireless communication includes means for receiving an indication of a plurality of cell groups associated with serving a UE from a wireless communication device, wherein the indication includes information indicating whether each cell group of the plurality of cell groups has been selected for serving the UE or has been deselected for serving the UE; and means for updating a list of serving cell groups of the UE based at least in part on the indication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
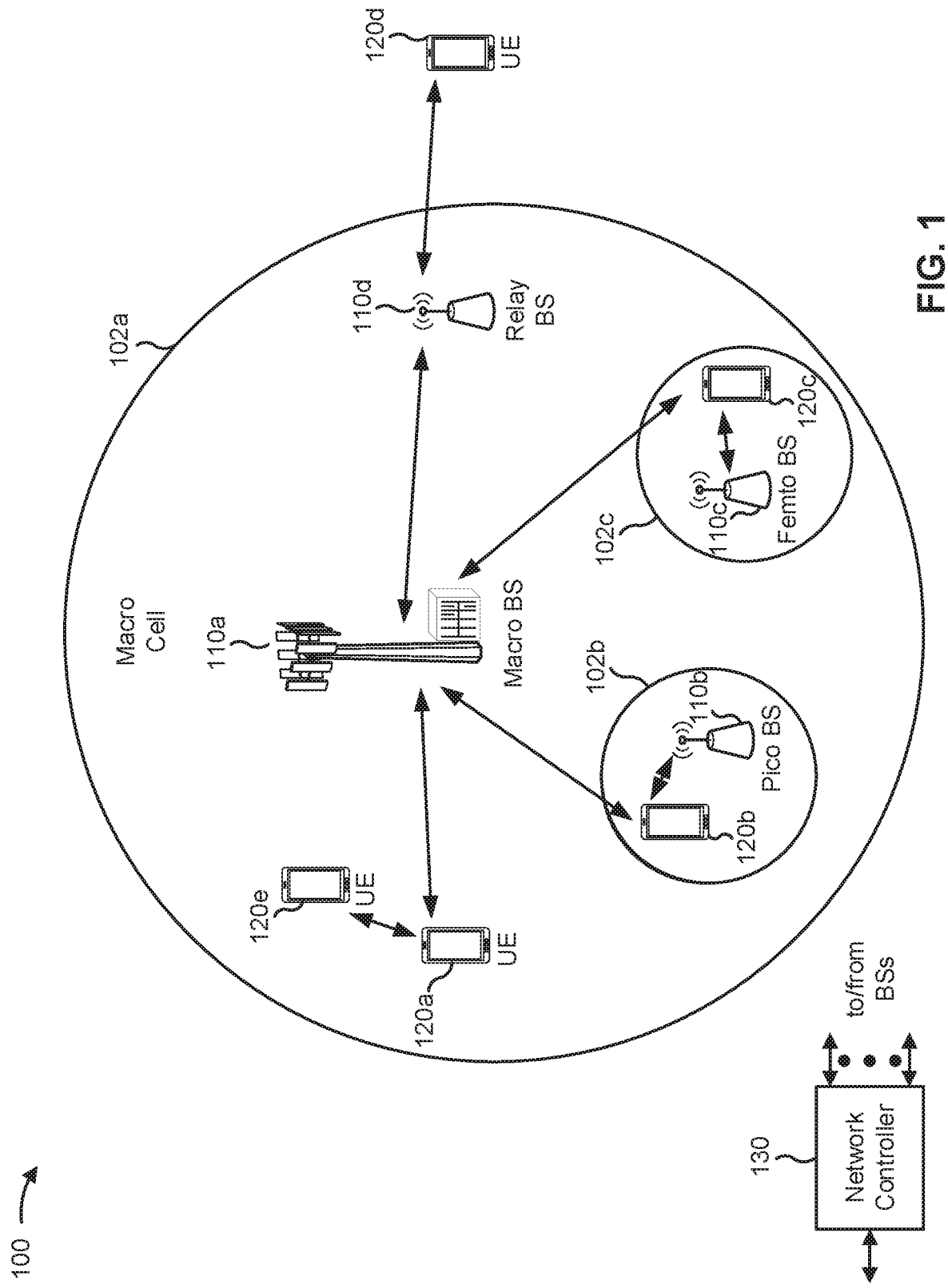
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a wireless communication device of FIG. 1 (e.g., base station 110, UE 120, network controller 130, and/or the like) may perform one or more operations associated with indication of multiple selected/deselected cells for supporting L1/L2 based mobility, as described herein. For example, the wireless communication device may, after selecting/deselecting a plurality of cells for serving a UE 120, provide an indication of the plurality of cells, where the indication includes information indicating whether each cell of the plurality of cells has been selected for serving the UE or has been deselected for serving the UE.

As indicated above, FIG. 1 is provided as an example. Other examples may differ from what is described with regard to FIG. 1.

Figure 2:
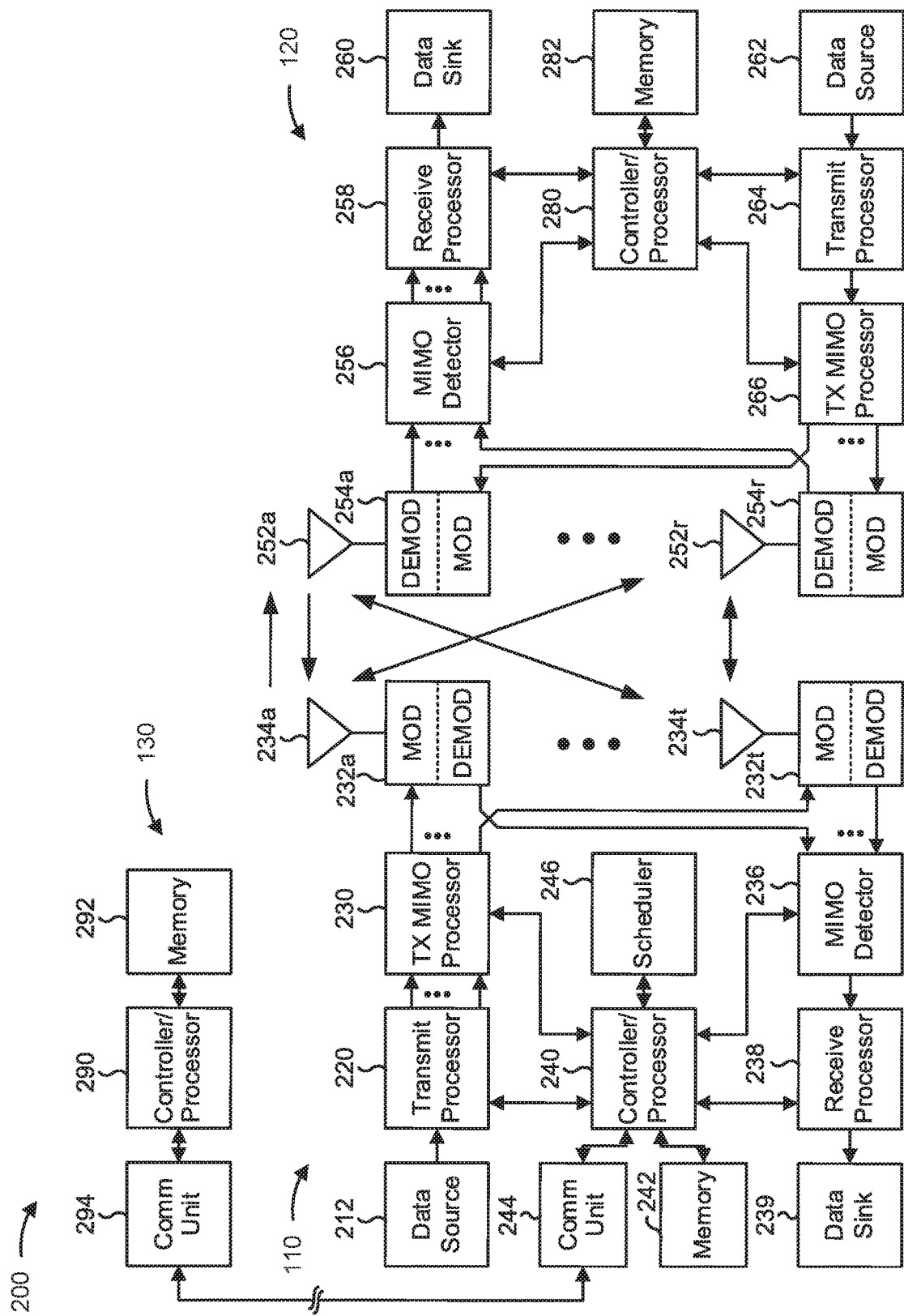
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multiple selected/deselected cells for L1/L2 based mobility, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 600 of FIG. 6, and/or other processes as described herein. A scheduler 246 may schedule UEs for data transmission on the downlink and/or uplink.

In some aspects, a first wireless communication device (e.g., a UE 120, a base station 110) may include means for identifying a plurality of cells associated with serving a UE 120, wherein each cell of the plurality of cells has been either selected for serving the UE 120 or deselected for serving the UE 120; means for transmitting an indication of the plurality of cells associated with serving the UE 120 to a second wireless communication device (e.g., a base station 110, a UE 120), wherein the indication includes information indicating whether each cell of the plurality of cells has been selected for serving the UE 120 or has been deselected for serving the UE 120; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a first wireless communication device (e.g., a UE 120, a base station 110) may include means for identifying a plurality of cell groups associated with serving a UE 120, wherein each cell group of the plurality of cell groups has been either selected for serving the UE 120 or deselected for serving the UE 120; means for transmitting an indication of the plurality of cell groups associated with serving the UE 120 to a second wireless communication device (e.g., a base station 110, a UE 120), wherein the indication includes information indicating whether each cell group of the plurality of cell groups has been selected for serving the UE 120 or has been deselected for serving the UE 120; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a second wireless communication device (e.g., a UE 120, a base station 110) may include means for receiving an indication of a plurality of cells associated with serving a UE 120 from a first wireless communication device (e.g., a base station 110, a UE 120), wherein the indication includes information indicating whether each cell of the plurality of cells has been selected for serving the UE 120 or has been deselected for serving the UE 120; means for updating a list of serving cells of the UE 120 based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a second wireless communication device (e.g., a UE 120, a base station 110) may include means for receiving an indication of a plurality of cell groups associated with serving a UE 120 from a first wireless communication device (e.g., a base station 110, a UE 120), wherein the indication includes information indicating whether each cell group of the plurality of cell groups has been selected for serving the UE 120 or has been deselected for serving the UE 120; means for updating a list of serving cell groups of the UE 120 based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some wireless communication systems, such as an NR system, a set of mechanisms by which UEs and base stations establish directional links (e.g., using high-dimensional phased arrays) may be useful (e.g., to benefit from beamforming gain and/or to maintain acceptable communication quality). Such directional links, however, require fine alignment of transmit and receive beams. This alignment may be achieved through a set of operations referred to as beam management.

Further, a wireless communication system may support multi-beam operation in a relatively high carrier frequency (e.g., within Frequency Range 2 (FR2)). In such cases, the higher carrier frequency makes propagation conditions harsher than at a comparatively lower carrier frequency. For example, signals propagating in a millimeter wave band may suffer from increased pathloss and severe channel intermittency, and/or may be blocked by objects commonly present in an environment of the UE (e.g., a building, a tree, a body of a user, and/or the like), as compared to a sub-6 gigahertz (GHz) band. As a result, beam management is of particular importance for multi-beam operation in a relatively high carrier frequency.

One possible enhancement for multi-beam operation in a higher carrier frequency is facilitation of efficient (e.g., low latency and low overhead) beam management to support higher L1/L2-centric inter-cell mobility. L1/L2-centric inter-cell mobility may be used when, for example, a multi-beam UE operating in FR2 moves from one or more first cells to one or more second cells. Notably, such cell switching may be used regularly due to operation in FR2. Numerous operation modes of L1/L2-centric inter-cell mobility are possible. One goal for L1/L2-centric inter-cell mobility is to enable a UE to perform a cell switch via a lower layer (e.g., L1 and/or L2) rather than a higher layer, which increases efficiency of the cell switch (e.g., by reducing latency and overhead).

In an L1/L2-centric inter-cell mobility scenario with multi-beam operation, a wireless communication device (e.g., a UE, a base station, and/or the like) may need to simultaneously select one or more cells and/or deselect one or more cells for serving the UE. For example, the wireless communication device may need to select/deselect from a pool of 32 candidate cells for a given physical cell site (e.g., where each of the 32 candidate cells covers a different frequency). A technique for indicating the multiple selected/deselected cells may help to support L1/L2-centric inter-cell mobility.

Some aspects described herein provide techniques and apparatuses for indication of multiple selected/deselected cells for supporting L1/L2 based mobility. In some aspects, indication of the multiple cells in the manner described here may enable cell switching via a lower layer (e.g., L1 and/or L2), thereby increasing efficiency (e.g., by reducing latency and/or overhead) of beam management in support of L1/L2-centric inter-cell mobility.

Figure 3:
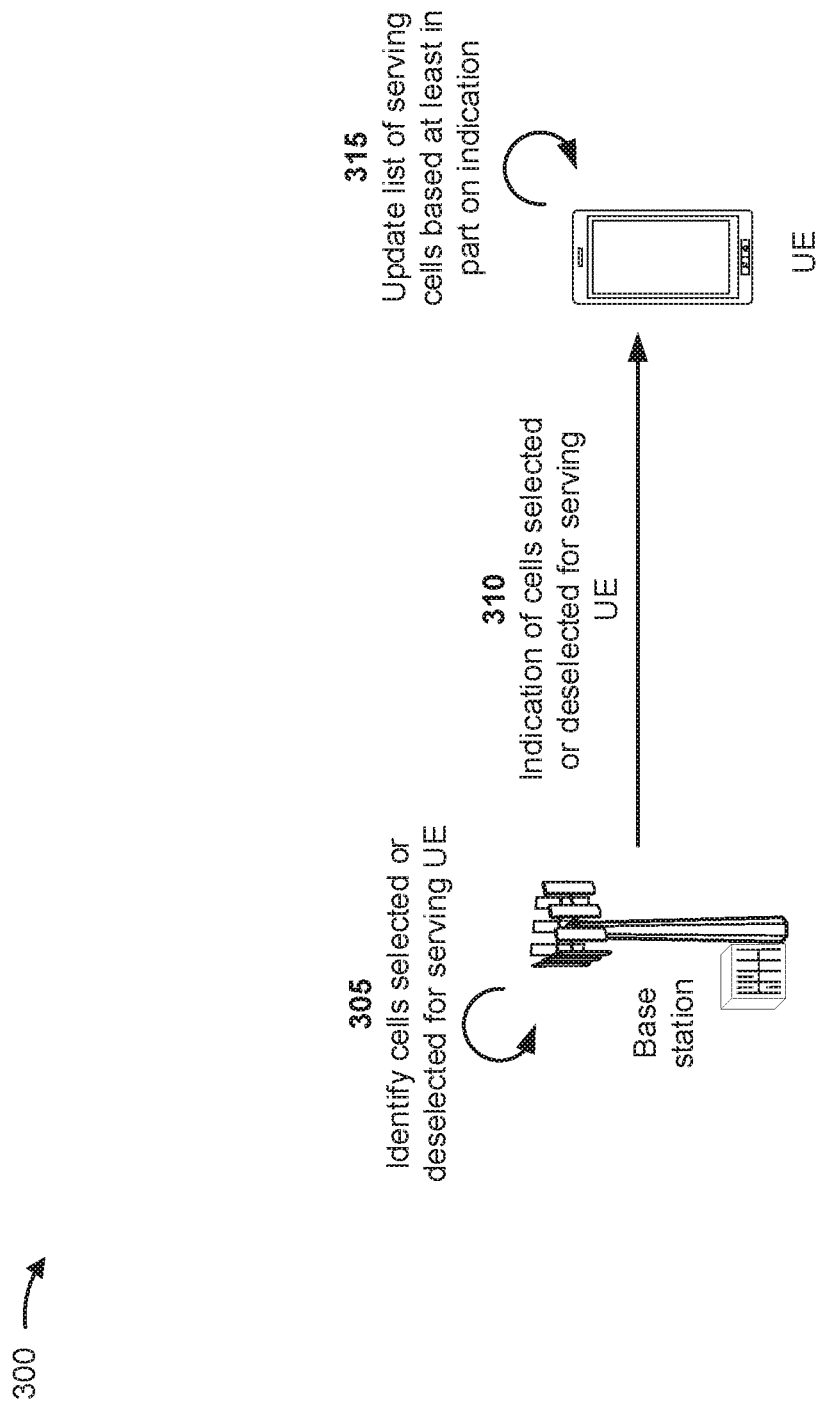
FIG. 3 is a diagram of an example associated with indication of multiple selected/deselected cells for supporting L1/L2 based mobility, in accordance with various aspects of the present disclosure.

FIG. 3 is a diagram illustrating an example associated with indication of multiple selected/deselected cells for supporting L1/L2 based mobility, in accordance with various aspects of the present disclosure. Notably, in the example shown in FIG. 3, the wireless communication device indicating the multiple selected/deselected cells is a base station (e.g., a base station 110) indicating multiple selected/deselected cells to a UE (e.g., a UE 120). However, in other examples the wireless communication device indicating the multiple selected/deselected cells may be another type of wireless communication device, such as a UE (e.g., a UE 120) indicating the multiple selected/deselected cells to a base station (e.g., a base station 110).

As shown by reference 305, the wireless communication device may identify a plurality of cells associated with serving the UE. For example, when the wireless communication device is the UE, the UE may use receive processor 258, controller/processor 280, and/or the like, to identify a plurality of cells associated with serving the UE. As another example, when the wireless communication device is a base station (e.g., a base station 110), the base station may use processor 220, controller/processor 240, and/or the like, to identify a plurality of cells associated with serving the UE. Here, the plurality of cells associated with the serving the UE includes a plurality of cells, each of which has been either selected for serving the UE or deselected for serving the UE.

In some aspects, the wireless communication device may select or deselect a given cell of the plurality of cells for serving the UE based on a reference signal associated with the cell. For example, the wireless communication device may select or deselect a given cell of the plurality of cells based on a reference signal received power (RSRP) associated with the given cell (e.g., an RSRP per reported synchronization signal block (SSB) identifier, an RSRP per reported SSB identifier per physical cell identifier (PCI), and/or the like).

In some aspects, the manner in which a given cell of the plurality of cells is selected or deselected may depend on an operation mode of L1/L2-centric inter-cell mobility. A first example of an operation mode may include a mode of operation in which each serving cell has one physical cell identifier (PCI) and can have multiple physical cell sites (e.g., remote radio headers (RRH)). Here, each RRH may transmit a different set of synchronization signal block (SSB) identifiers, but with a same PCI for the serving cell. In this operation mode, downlink control information (DCI) or a medium access control control element (MAC-CE) can indicate one or more RRHs or corresponding SSBs selected to serve the UE based at least in part on a RSRP per reported SSB identifier. A second example of an operation mode includes a mode of operation in which each serving cell can be configured with multiple PCIs, and each RRH of the serving cell can use one PCI configured for the serving cell and can transmit a full set of SSB identifiers. Here, DCI or a MAC-CE can indicate one or more RRHs or one or more corresponding PCIs and/or SSBs selected to serve the UE based at least in part on a RSRP per reported SSB identifier per reported PCI. A third example of an operation mode may include a mode of operation mode in which each serving cell has one PCI. Here, DCI or a MAC-CE can indicate one or more serving cells or corresponding serving cell identifiers selected to serve the UE based on a RSRP per reported SSB identifier per reported PCI. Notably, while SSBs are described in the above examples, an SSB can be another type of cell-defining reference signal (e.g., a channel state information reference signal (CSI-RS), positioning reference signal (PRS), and/or the like).

In some aspects, where the selection of cells for serving a UE is done by a network entity or a base station, a UE may measure a reference signal (e.g., the UE may measure a RSRP) and report the measurements or other details about the measurement to the network. Based on these reports, the network entity or base station may select or deselect cells for serving the UE.

As shown by reference 310, the wireless communication device may transmit an indication of the plurality of cells associated with serving the UE to another wireless communication device. For example, when the wireless communication device is the UE, the UE may use transmit processor 264, controller/processor 280, and/or the like, to transmit an indication of the plurality of cells associated with serving the UE to a base station. As another example, when the wireless communication device is the base station, the base station may use transmit processor 220, controller/processor 240, and/or the like, to transmit an indication of the plurality of cells associated with serving the UE to the UE. Here, the indication includes information indicating, for each cell of the plurality of cells, whether the cell has been selected for serving the UE or has been deselected for serving the UE. In some aspects, the wireless communication device may transmit the indication via, for example, radio resource control (RRC) signaling, a MAC-CE, DCI, and/or the like.

In some aspects, for a given cell of the plurality of cells, the indication may include information that identifies the given cell. In some aspects, the information that identifies the given cell may include, for example, a serving cell identifier or a PCI.

In some aspects, for a given cell of the plurality of cells, the indication may include a cell group identifier associated with a cell group of the given cell. In some aspects, the cell group identified by the cell group identifier may be a primary cell group or a secondary cell group. In some aspects, a primary cell group may include a group of primary cells, where a primary cell is a cell operating on a primary frequency associated with performing operations such as initial connection establishment, a connection re-establishment procedure, and/or the like. In some aspects, a secondary cell group may include a group of secondary cells, where secondary cell is a cell operating on a secondary frequency that may be used, for example, to provide additional radio resources.

In some aspects, for a given cell of the plurality of cells, the indication may include a cell type indicator associated with the given cell. For example, in some aspects, the cell type indicator may indicate, for example, whether the given cell is a primary cell, a secondary cell, or a primary secondary cell (e.g., a secondary cell configured with a physical uplink control channel (PUCCH) resource to enable transmission of hybrid automatic repeat request (HARQ) feedback, channel state information (CSI), and/or the like, associated with one or more secondary cells). As another example, in some aspects, the cell type indicator may indicate whether the given cell is a PUCCH cell or a non-PUCCH cell. A PUCCH cell may be a cell that allows PUCCH communication on the cell, while a non-PUCCH cell may be a cell that does not allow PUCCH communication on the cell. In some aspects, control and/or uplink may only be used on one cell (e.g., a cell operating in a lower frequency range, such as a sub-6 GHz frequency) while other cells may be downlink-only cells (e.g., in order to support high data rates).

As described above, each cell of the plurality of cells has been selected for serving the UE or has been deselected for serving the UE. In some aspects, when a given cell of the plurality of cells has been selected for serving the UE, the indication may include information indicating that the given cell is to be added to a list of cells for serving the UE (e.g., when a list of cells for serving the UE is maintained by the wireless communication device receiving the indication). Similarly, in some aspects, when a given cell of the plurality of cells has been deselected for serving the UE, the indication may include information indicating that the given cell is to be removed from a list of cells for serving the UE, if the given cell is in the list of cells for serving the UE. In some aspects, a given cell that is not selected for serving the UE may be considered as having been deselected even if it was not previously selected for serving the UE. In some aspects, a given cell that is not selected for serving the UE but was previously selected for serving the UE may be indicated as having been deselected.

In some aspects, the information indicating whether each cell of the plurality of cells has been selected for serving the UE or has been deselected for serving the UE includes a list of cells selected for serving the UE. That is, in some aspects, the indication may include a full list of cells for serving the UE. Here, inclusion of a given cell in the indication serves to indicate that the given cell has been selected for serving the UE, while exclusion of a given cell from the indication serves to indicate that the given cell has been deselected for serving the UE, or has not been selected for serving the UE.

In some aspects, as shown by reference 315, another wireless communication device may receive the indication and may update a list of serving cells of the UE based at least in part on the indication. For example, when the other wireless communication device is the UE, the UE may use receive processor 258, controller/processor 280, and/or the like, to receive the indication and update a list of serving cells of the UE based at least in part on the indication. As another example, when the wireless communication device is the base station, the base station may use receive processor 238, controller/processor 240, and/or the like, to receive the indication and update the list of serving cells of the UE based at least in part on the indication.

As indicated above, FIG. 3 is provided as an example. Other examples may differ from what is described with regard to FIG. 3.

Figure 4:
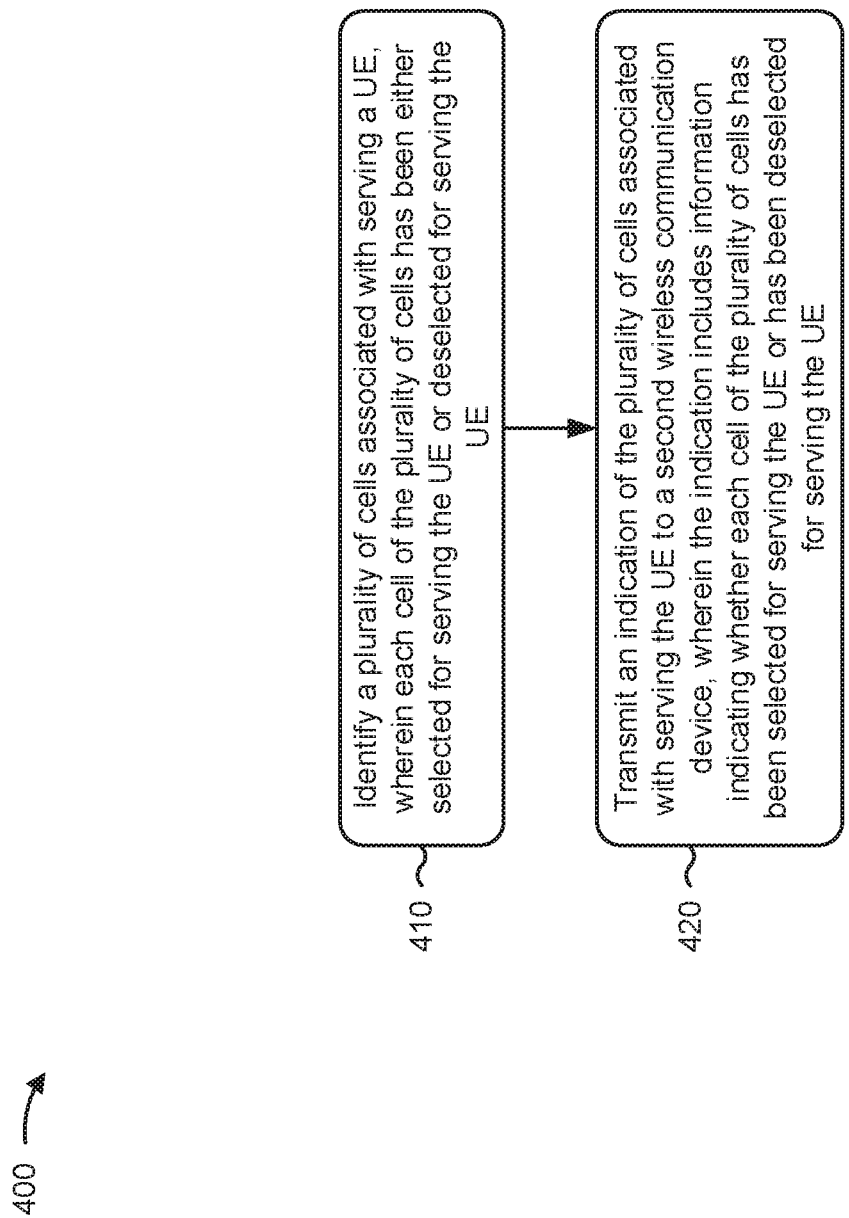
FIGS. 4 and 5 are diagrams illustrating example processes performed, for example, by wireless communication devices, in accordance with various aspects of the present disclosure.

FIG. 4 is a diagram illustrating an example process 400 performed, for example, by a first wireless communication device, in accordance with various aspects of the present disclosure. Example process 400 is an example where the first wireless communication device (e.g., UE 120, base station 110, and/or the like) performs operations associated with multiple selected/deselected cells for L1/L2 based mobility.

As shown in FIG. 4, in some aspects, process 400 may include identifying a plurality of cells associated with serving a UE, wherein each cell of the plurality of cells has been either selected for serving the UE or deselected for serving the UE (block 410). For example, the first wireless communication device (e.g., using receive processor 258, transmit processor 264, controller/processor 280, memory 282, and/or the like, when the first wireless communication device is a UE 120; using transmit processor 220, receive processor 238, controller/processor 240, memory 242, and/or the like, when the first wireless communication device is a base station 110; using identification component 908) may identify a plurality of cells associated with serving a UE (e.g., UE 120), as described above. In some aspects, each cell of the plurality of cells has been either selected for serving the UE or deselected for serving the UE. In some aspects, the first wireless communication device may identify the plurality of cells associated with serving the UE in a manner similar to that described above in association with reference 305 of FIG. 3.

As further shown in FIG. 4, in some aspects, process 400 may include transmitting an indication of the plurality of cells associated with serving the UE to a second wireless communication device, wherein the indication includes information indicating whether each cell of the plurality of cells has been selected for serving the UE or has been deselected for serving the UE (block 420). For example, the first wireless communication device (e.g., using transmit processor 264, controller/processor 280, memory 282, and/or the like, when the first wireless communication device is a UE 120; using transmit processor 220, controller/processor 240, memory 242, and/or the like, when the first wireless communication device is a base station 110; transmission component 904) may transmit an indication of the plurality of cells associated with serving the UE to a second wireless communication device (e.g., the UE 120, a base station, or the like), as described above. In some aspects, the indication includes information indicating whether each cell of the plurality of cells has been selected for serving the UE or has been deselected for serving the UE. In some aspects, the first wireless communication device may transmit the indication of the plurality of cells associated with serving the UE in a manner similar to that described above in association with reference 310 of FIG. 3.

Process 400 may include additional aspects, such as any single aspect or any combination of aspects described below and/or in connection with one or more other processes described elsewhere herein.

In a first aspect, for a given cell of the plurality of cells, the indication includes information that identifies the given cell.

In a second aspect, alone or in combination with the first aspect, the information that identifies the given cell includes at least one of a serving cell identifier or a physical cell identifier.

In a third aspect, alone or in combination with one or more of the first and second aspects, for a given cell of the plurality of cells, the indication includes a cell group identifier associated with a cell group of the given cell.

In a fourth aspect, alone or in combination with one or more of the first through third aspects, the cell group is a primary cell group or a secondary cell group.

In a fifth aspect, alone or in combination with one or more of the first through fourth aspects, for a given cell of the plurality of cells, the indication includes a cell type indicator associated with the given cell.

In a sixth aspect, alone or in combination with one or more of the first through fifth aspects, the cell type indicator indicates whether the given cell is a primary cell, a secondary cell, or a primary secondary cell.

In a seventh aspect, alone or in combination with one or more of the first through sixth aspects, the cell type indicator indicates whether the given cell is a physical uplink control channel (PUCCH) cell or a non-PUCCH cell.

In an eighth aspect, alone or in combination with one or more of the first through seventh aspects, when a given cell of the plurality of cells has been selected for serving the UE, the indication includes information indicating that the given cell is to be added to a list of cells for serving the UE.

In a ninth aspect, alone or in combination with one or more of the first through eighth aspects, when a given cell of the plurality of cells has been deselected for serving the UE, the indication includes information indicating that the given cell is to be removed from a list of cells for serving the UE.

In a tenth aspect, alone or in combination with one or more of the first through ninth aspects, the information indicating whether each cell of the plurality of cells has been selected for serving the UE or has been deselected for serving the UE includes a list of cells selected for serving the UE.

In an eleventh aspect, alone or in combination with one or more of the first through tenth aspects, the indication is transmitted via RRC signaling.

In a twelfth aspect, alone or in combination with one or more of the first through eleventh aspects, the indication is transmitted via a MAC-CE element.

In a thirteenth aspect, alone or in combination with one or more of the first through twelfth aspects, the indication is transmitted via DCI.

In a fourteenth aspect, alone or in combination with one or more of the first through thirteenth aspects, the first wireless communication device is a base station and the second wireless communication device is the UE.

In a fifteenth aspect, alone or in combination with one or more of the first through thirteenth aspects, the first wireless communication device is the UE and the second wireless communication device is a base station.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
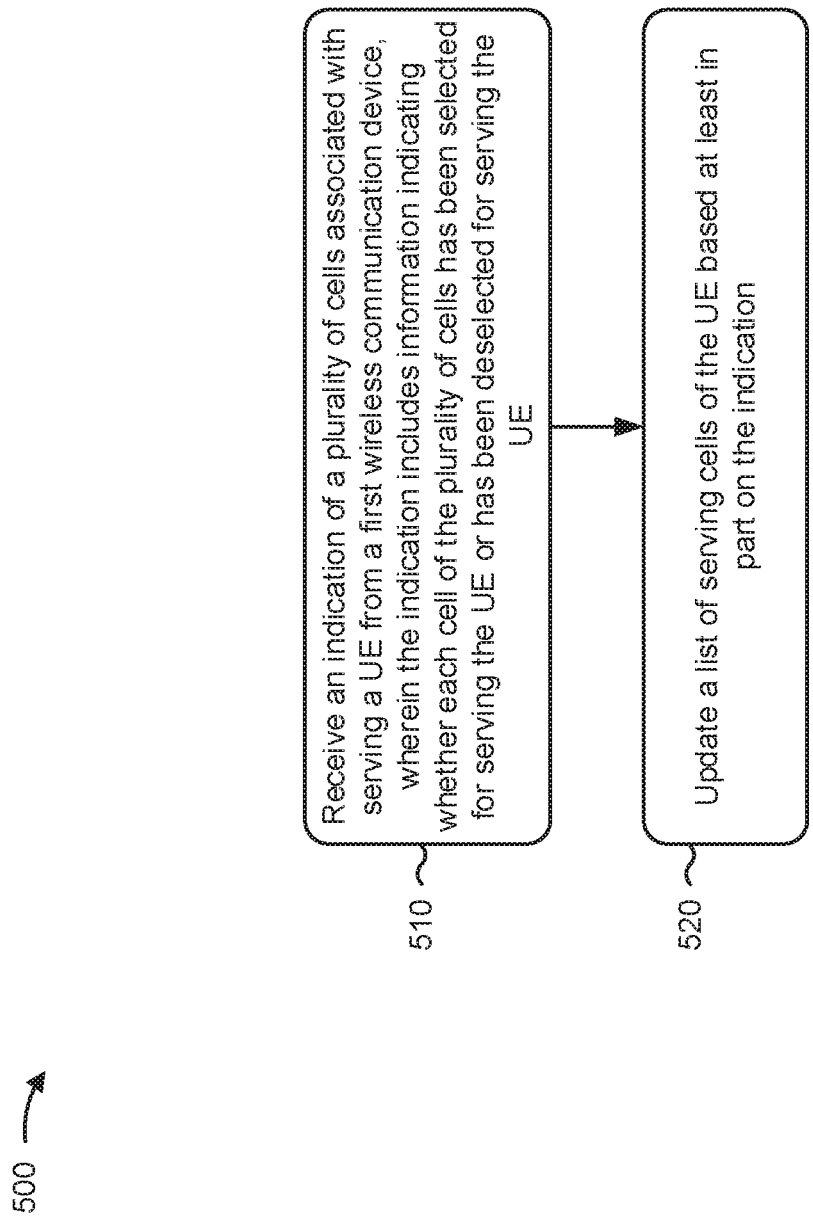

FIG. 5 is a diagram illustrating an example process 500 performed, for example, by a second wireless communication device, in accordance with various aspects of the present disclosure. Example process 500 is an example where the second wireless communication device (e.g., UE 120, base station 110) performs operations associated with multiple selected/deselected cells for L1/L2 based mobility.

As shown in FIG. 5, in some aspects, process 500 may include receiving an indication of a plurality of cells associated with serving a UE from a first wireless communication device, wherein the indication includes information indicating whether each cell of the plurality of cells has been selected for serving the UE or has been deselected for serving the UE (block 510). For example, the second wireless communication device (e.g., using receive processor 258, controller/processor 280, memory 282, and/or the like, when the second wireless communication device is a UE 120; using receive processor 238, controller/processor 240, memory 242, and/or the like, when the second wireless communication device is a base station 110; using reception component 1002) may receive an indication of a plurality of cells associated with serving a UE from a first wireless communication device (e.g., a base station 110, a UE 120, or the like), wherein the indication includes information indicating whether each cell of the plurality of cells has been selected for serving the UE or has been deselected for serving the UE, as described above. In some aspects, the second wireless communication device may receive the indication in a manner similar to that described above in association with reference 315 of FIG. 3.

As further shown in FIG. 5, in some aspects, process 500 may include updating a list of serving cells of the UE based at least in part on the indication (block 520). For example, the second wireless communication device (e.g., using receive processor 258, transmit processor 264, controller/processor 280, memory 282, and/or the like, when the second wireless communication device is a UE 120; using transmit processor 220, receive processor 238, controller/processor 240, memory 242, and/or the like, when the second wireless communication device is a base station 110; using update component 1008) may update a list of serving cells of the UE based at least in part on the indication, as described above. In some aspects, the second wireless communication device may update the list of serving cells of the UE based at least in part on the indication, in a manner similar to that described above in association with reference 315 of FIG. 3.

Process 500 may include additional aspects, such as any single aspect or any combination of aspects described below and/or in connection with one or more other processes described elsewhere herein.

In a first aspect, for a given cell of the plurality of cells, the indication includes information that identifies the given cell. In a second aspect, in combination with the first aspect, the information that identifies the given cell includes at least one of a serving cell identifier or a physical cell identifier.

In a third aspect, alone or in combination with one or more of the first and second aspects, for a given cell of the plurality of cells, the indication includes a cell group identifier associated with a cell group of the given cell. In a fourth aspect, in combination with the third aspect, the cell group is a primary cell group or a secondary cell group.

In a fifth aspect, alone or in combination with one or more of the first through fourth aspects, for a given cell of the plurality of cells, the indication includes a cell type indicator associated with the given cell. In a sixth aspect, in combination with the fifth aspect, the cell type indicator indicates whether the given cell is a primary cell, a secondary cell, or a primary secondary cell. In a seventh aspect, alone or in combination with one or more of the fifth and sixth aspects, the cell type indicator indicates whether the given cell is a PUCCH cell or a non-PUCCH cell.

In an eighth aspect, alone or in combination with one or more of the first through seventh aspects, when a given cell of the plurality of cells has been selected for serving the UE, the indication includes information indicating that the given cell is to be added to a list of cells for serving the UE.

In a ninth aspect, alone or in combination with one or more of the first through eight aspects, when a given cell of the plurality of cells has been deselected for serving the UE, the indication includes information indicating that the given cell is to be removed from a list of cells for serving the UE.

In a tenth aspect, alone or in combination with one or more of the first through ninth aspects, the information indicating whether each cell of the plurality of cells has been selected for serving the UE or has been deselected for serving the UE includes a list of cells selected for serving the UE.

In an eleventh aspect, alone or in combination with one or more of the first through tenth aspects, the indication is transmitted via radio resource control signaling. In a twelfth aspect, alone or in combination with one or more of the first through eleventh aspects, the indication is transmitted via a medium access control control element. In a thirteenth aspect, alone or in combination with one or more of the first through twelfth aspects, the indication is transmitted via downlink control information.

In a fourteenth aspect, alone or in combination with one or more of the first through thirteenth aspects, the second wireless communication device is a base station and the first wireless communication device is the UE. In a fifteenth aspect, alone or in combination with one or more of the first through thirteenth aspects, the second wireless communication device is the UE and the first wireless communication device is a base station.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
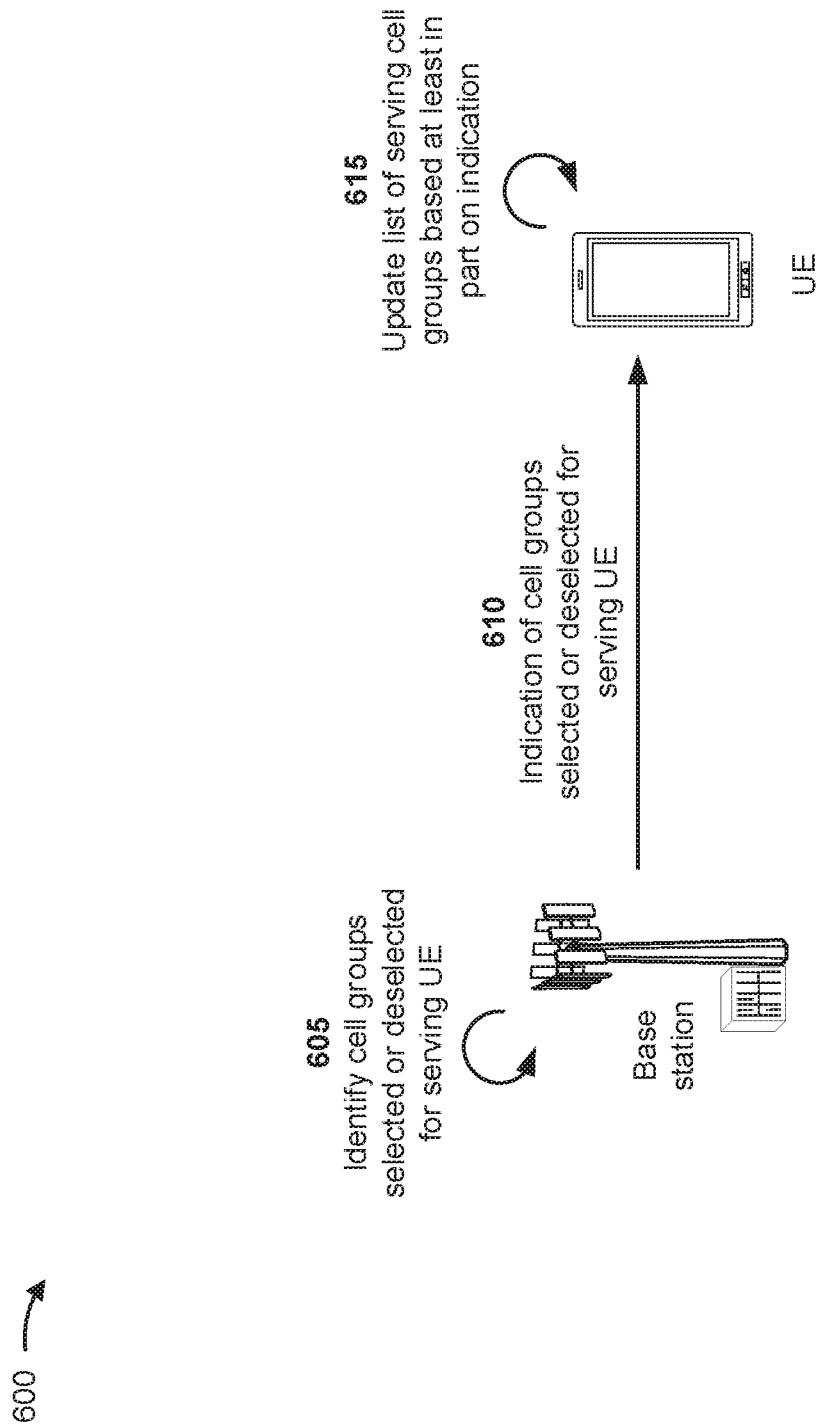
FIG. 6 is a diagram of an example associated with indication of multiple selected/deselected cells for supporting L1/L2 based mobility, in accordance with various aspects of the present disclosure.

FIG. 6 is a diagram illustrating an example associated with indication of multiple selected/deselected cells for supporting L1/L2 based mobility, in accordance with various aspects of the present disclosure. Notably, in the example shown in FIG. 6, the wireless communication device indicating the multiple selected/deselected cells is a base station (e.g., a base station 110) indicating multiple selected/deselected cells to a UE (e.g., a UE 120). However, in other examples the wireless communication device indicating the multiple selected/deselected cells may be another type of wireless communication device, such as a UE (e.g., a UE 120) indicating the multiple selected/deselected cells to a base station (e.g., a base station 110).

As shown by reference 605, the wireless communication device may identify a plurality of cell groups associated with serving the UE. For example, when the wireless communication device is the UE, the UE may use receive processor 258, controller/processor 280, and/or the like, to identify a plurality of cell groups associated with serving the UE. As another example, when the wireless communication device is a base station (e.g., a base station 110), the base station may use processor 220, controller/processor 240, and/or the like, to identify a plurality of cell groups associated with serving the UE. Here, the plurality of cell groups associated with the serving the UE includes a plurality of cell groups, each of which has been either selected for serving the UE or deselected for serving the UE.

In some aspects, the wireless communication device may select or deselect a given cell group of the plurality of cell groups for serving the UE based on a reference signal associated with the cell group. For example, the wireless communication device may select or deselect a given cell group of the plurality of cell groups based on a reference signal received power (RSRP) associated with the given cell group. In some aspects, the manner in which a given cell group of the plurality of cell groups is selected or deselected may depend on an operation mode of L1/L2-centric inter-cell mobility, examples of which are provided above. In some aspects, where the selection of cells for serving a UE is done by a network entity or a base station, a UE may measure a reference signal (e.g., the UE may measure a RSRP) and report the measurements or other details about the measurement to the network. Based on these reports, the network entity or base station may select or deselect cells for serving the UE.

As shown by reference 610, the wireless communication device may transmit an indication of the plurality of cell groups associated with serving the UE to another wireless communication device. For example, when the wireless communication device is the UE, the UE may use transmit processor 264, controller/processor 280, and/or the like, to transmit an indication of the plurality of cell groups associated with serving the UE to the base station. As another example, when the wireless communication device is the base station, the base station may use transmit processor 220, controller/processor 240, and/or the like, to transmit an indication of the plurality of cell groups associated with serving the UE to the UE. Here, the indication includes information indicating whether each cell group of the plurality of cell groups has been selected for serving the UE or has been deselected for serving the UE. In some aspects, the wireless communication device may transmit the indication via, for example, RRC signaling, a MAC-CE, DCI, and/or the like.

In some aspects, for a given cell group of the plurality of cell groups, the indication includes a cell group identifier associated with the given cell group. In some aspects, the given cell group may be a primary cell group or a secondary cell group.

As described above, each cell group of the plurality of cell groups has been selected for serving the UE or has been deselected for serving the UE. In some aspects, when a given cell group of the plurality of cell groups has been selected for serving the UE, the indication may include information indicating that the given cell group is to be added to a list of cell groups for serving the UE (e.g., when a list of cell groups for serving the UE is maintained by the wireless communication device receiving the indication). Similarly, in some aspects, when a given cell group of the plurality of cell groups has been deselected for serving the UE, the indication may include information indicating that the given cell group is to be removed from a list of cell groups for serving the UE, if the given cell group is in the list of cell groups for serving the UE. In some aspects, a given cell group that is not selected for serving the UE may be considered as having been deselected even if it was not previously selected for serving the UE. In some aspects, a given cell group that is not selected for serving the UE but was previously selected for serving the UE may be indicated as having been deselected.

In some aspects, the information indicating whether each cell group of the plurality of cell groups has been selected for serving the UE or has been deselected for serving the UE includes a list of cell groups selected for serving the UE. That is, in some aspects, the indication may include a full list of cell groups for serving the UE. Here, inclusion of a given cell group in the indication serves to indicate that the given cell group has been selected for serving the UE, while exclusion of a given cell group from the indication serves to indicate that the given cell group has been deselected for serving the UE, or has not been selected for serving the UE.

In some aspects, as shown by reference 615, another wireless communication device may receive the indication and may update a list of serving cell groups of the UE based at least in part on the indication. For example, when the other wireless communication device is the UE, the UE may use receive processor 258, controller/processor 280, and/or the like, to receive the indication and update a list of serving cell groups of the UE based at least in part on the indication. As another example, when the wireless communication device is the base station, the base station may use receive processor 238, controller/processor 240, and/or the like, to receive the indication and update the list of serving cell groups of the UE based at least in part on the indication.

As indicated above, FIG. 6 is provided as an example. Other examples may differ from what is described with regard to FIG. 6.

Figure 7:
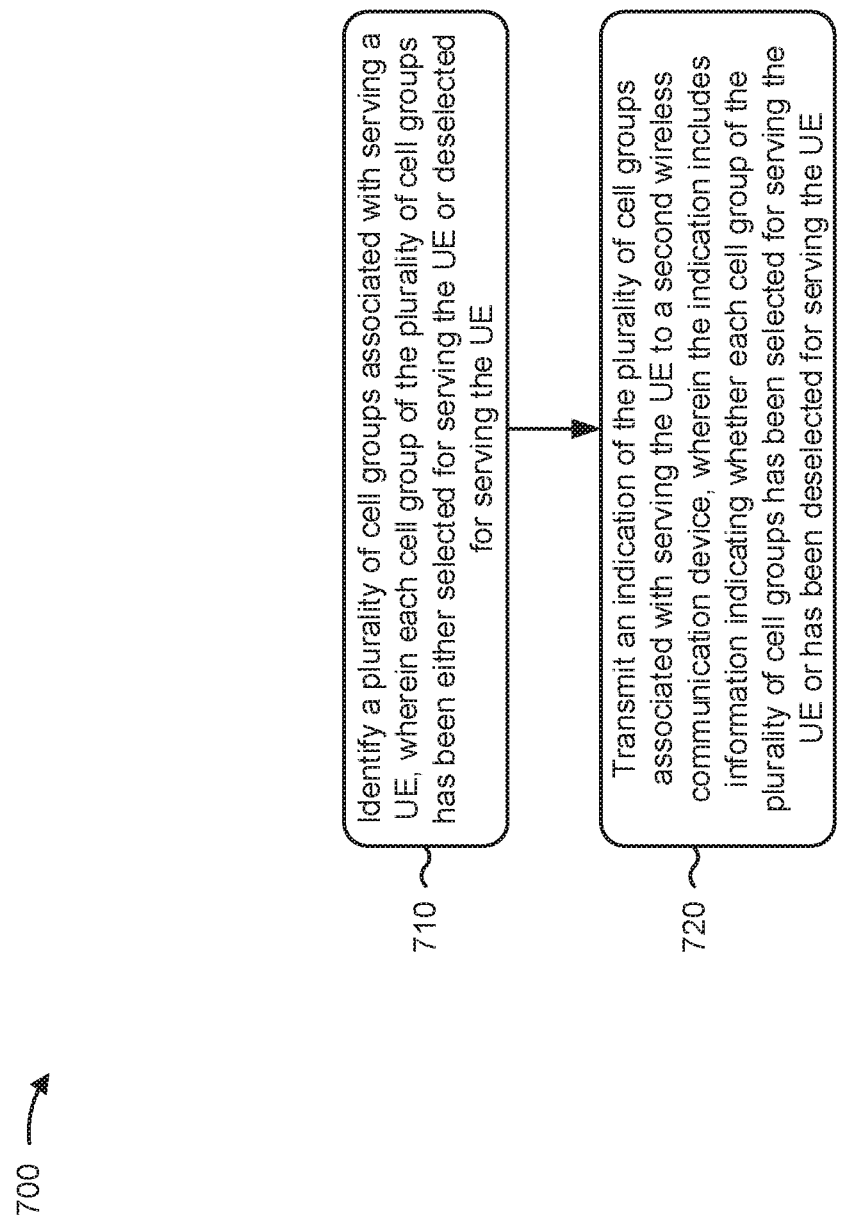
FIGS. 7 and 8 are diagrams illustrating example processes performed, for example, by wireless communication devices, in accordance with various aspects of the present disclosure.

FIG. 7 is a diagram illustrating an example process 700 performed, for example, by a first wireless communication device, in accordance with various aspects of the present disclosure. Example process 700 is an example where the wireless first communication device (e.g., UE 120, base station 110, and/or the like) performs operations associated with multiple selected/deselected cells for L1/L2 based mobility.

As shown in FIG. 7, in some aspects, process 700 may include identifying a plurality of cell groups associated with serving a UE, wherein each cell group of the plurality of cell groups has been either selected for serving the UE or deselected for serving the UE (block 710). For example, the first wireless communication device (e.g., using receive processor 258, transmit processor 264, controller/processor 280, memory 282, and/or the like, when the first wireless communication device is a UE 120; using transmit processor 220, receive processor 238, controller/processor 240, memory 242, and/or the like, when the first wireless communication device is a base station 110; using identification component 908) may identify a plurality of cell groups associated with serving a UE (e.g., UE 120), as described above. In some aspects, each cell group of the plurality of cell groups has been either selected for serving the UE or deselected for serving the UE. In some aspects, the first wireless communication device may identify the plurality of cell groups associated with serving the UE in a manner similar to that described above in association with reference 605 of FIG. 6.

As further shown in FIG. 7, in some aspects, process 700 may include transmitting an indication of the plurality of cell groups associated with serving the UE to a second wireless communication device, wherein the indication includes information indicating whether each cell group of the plurality of cell groups has been selected for serving the UE or has been deselected for serving the UE (block 720). For example, the first wireless communication device (e.g., using transmit processor 264, controller/processor 280, memory 282, and/or the like, when the wireless communication device is a UE 120; using transmit processor 220, controller/processor 240, memory 242, and/or the like, when the first wireless communication device is a base station 110; using transmission component 904) may transmit an indication of the plurality of cell groups associated with serving the UE to a second wireless communication device (e.g., the UE 120, a base station 110, or the like), as described above. In some aspects, the indication includes information indicating whether each cell group of the plurality of cell groups has been selected for serving the UE or has been deselected for serving the UE. In some aspects, the first wireless communication device may transmit the indication of the plurality of cell groups associated with serving the UE in a manner similar to that described above in association with reference 610 of FIG. 6.

Process 700 may include additional aspects, such as any single aspect or any combination of aspects described below and/or in connection with one or more other processes described elsewhere herein.

In a first aspect, for a given cell group of the plurality of cell groups, the indication includes a cell group identifier associated with the given cell group. In a second aspect, alone or in combination with the first aspect, the given cell group is a primary cell group or a secondary cell group.

In a third aspect, alone or in combination with one or more of the first and second aspects, when a given cell group of the plurality of cell groups has been selected for serving the UE, the indication includes information indicating that the given cell group is to be added to a list of cell groups for serving the UE.

In a fourth aspect, alone or in combination with one or more of the first through third aspects, when a given cell group of the plurality of cell groups has been deselected for serving the UE, the indication includes information indicating that the given cell group is to be removed from a list of cell groups for serving the UE.

In a fifth aspect, alone or in combination with one or more of the first through fourth aspects, the information indicating whether each cell group of the plurality of cell groups has been selected for serving the UE or has been deselected for serving the UE includes a list of cell groups selected for serving the UE.

In a sixth aspect, alone or in combination with one or more of the first through fifth aspects, the indication is transmitted via RRC signaling. In a seventh aspect, alone or in combination with one or more of the first through sixth aspects, the indication is transmitted via a MAC-CE. In an eighth aspect, alone or in combination with one or more of the first through seventh aspects, the indication is transmitted via DCI.

In a seventh aspect, alone or in combination with one or more of the first through sixth aspects, the first wireless communication device is a base station and the second wireless communication device is the UE. In an eighth aspect, alone or in combination with one or more of the first through sixth aspects, the first wireless communication device is the UE and the second wireless communication device is a base station.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
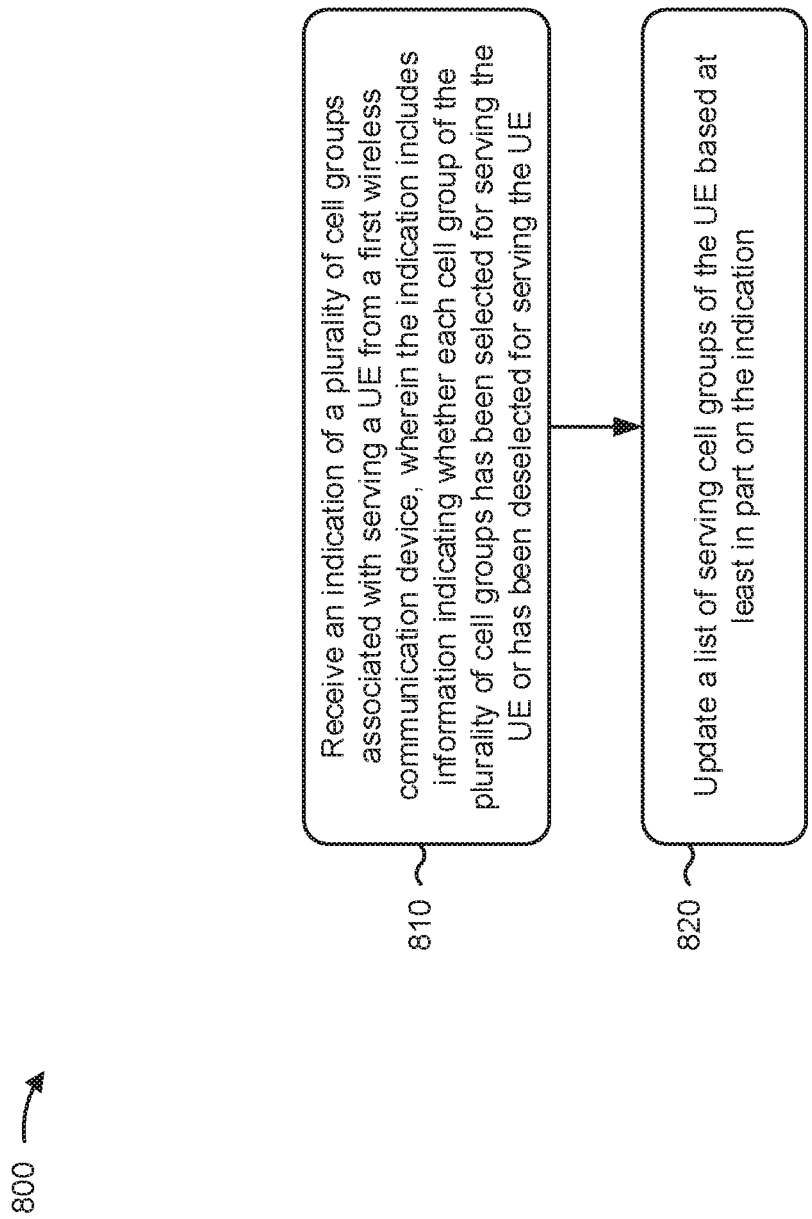

FIG. 8 is a diagram illustrating an example process 800 performed, for example, by a second wireless communication device, in accordance with various aspects of the present disclosure. Example process 800 is an example where the second wireless communication device (e.g., UE 120, base station 110) performs operations associated with multiple selected/deselected cells for L1/L2 based mobility.

As shown in FIG. 8, in some aspects, process 800 may include receiving an indication of a plurality of cell groups associated with serving a UE from a first wireless communication device, wherein the indication includes information indicating whether each cell group of the plurality of cell groups has been selected for serving the UE or has been deselected for serving the UE (block 810). For example, the second wireless communication device (e.g., using receive processor 258, controller/processor 280, memory 282, and/or the like, when the second wireless communication device is a UE 120; using receive processor 238, controller/processor 240, memory 242, and/or the like, when the second wireless communication device is a base station 110; using reception component 1002) may receive an indication of a plurality of cell groups associated with serving a UE from a first wireless communication device (e.g., a base station 110, the UE 120, or the like), wherein the indication includes information indicating whether each cell group of the plurality of cell groups has been selected for serving the UE or has been deselected for serving the UE, as described above. In some aspects, the second wireless communication device may receive the indication in a manner similar to that described above in association with reference 615 of FIG. 6.

As further shown in FIG. 8, in some aspects, process 800 may include updating a list of serving cell groups of the UE based at least in part on the indication (block 820). For example, the second wireless communication device (e.g., using receive processor 258, transmit processor 264, controller/processor 280, memory 282, and/or the like, when the second wireless communication device is a UE 120; using transmit processor 220, receive processor 238, controller/processor 240, memory 242, and/or the like, when the second wireless communication device is a base station 110; using update component 1008) may update a list of serving cell groups of the UE based at least in part on the indication, as described above. In some aspects, the second wireless communication device may update the list of serving cell groups of the UE based at least in part on the indication, in a manner similar to that described above in association with reference 615 of FIG. 6.

Process 800 may include additional aspects, such as any single aspect or any combination of aspects described below and/or in connection with one or more other processes described elsewhere herein.

In a first aspect, for a given cell group of the plurality of cell groups, the indication includes a cell group identifier associated with the given cell group. In a second aspect, in combination with the first aspect, the given cell group is a primary cell group or a secondary cell group.

In a third aspect, alone or in combination with one or more of the first and second aspects, when a given cell group of the plurality of cell groups has been selected for serving the UE, the indication includes information indicating that the given cell group is to be added to a list of cell groups for serving the UE.

In a fourth aspect, alone or in combination with one or more of the first through third aspects, when a given cell group of the plurality of cell groups has been deselected for serving the UE, the indication includes information indicating that the given cell group is to be removed from a list of cell groups for serving the UE.

In a fifth aspect, alone or in combination with one or more of the first through fourth aspects, the information indicating whether each cell group of the plurality of cell groups has been selected for serving the UE or has been deselected for serving the UE includes a list of cell groups selected for serving the UE.

In a sixth aspect, alone or in combination with one or more of the first through seventh aspects, the indication is transmitted via radio resource control signaling. In a seventh aspect, alone or in combination with one or more of the first through sixth aspects, the indication is transmitted via a medium access control control element. In an eighth aspect, alone or in combination with one or more of the first through seventh aspects, the indication is transmitted via downlink control information.

In a ninth aspect, alone or in combination with one or more of the first through eighth aspects, the first wireless communication device is a base station and the second wireless communication device is the UE. In a tenth aspect, alone or in combination with one or more of the first through eighth aspects, the first wireless communication device is the UE and the second wireless communication device is a base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
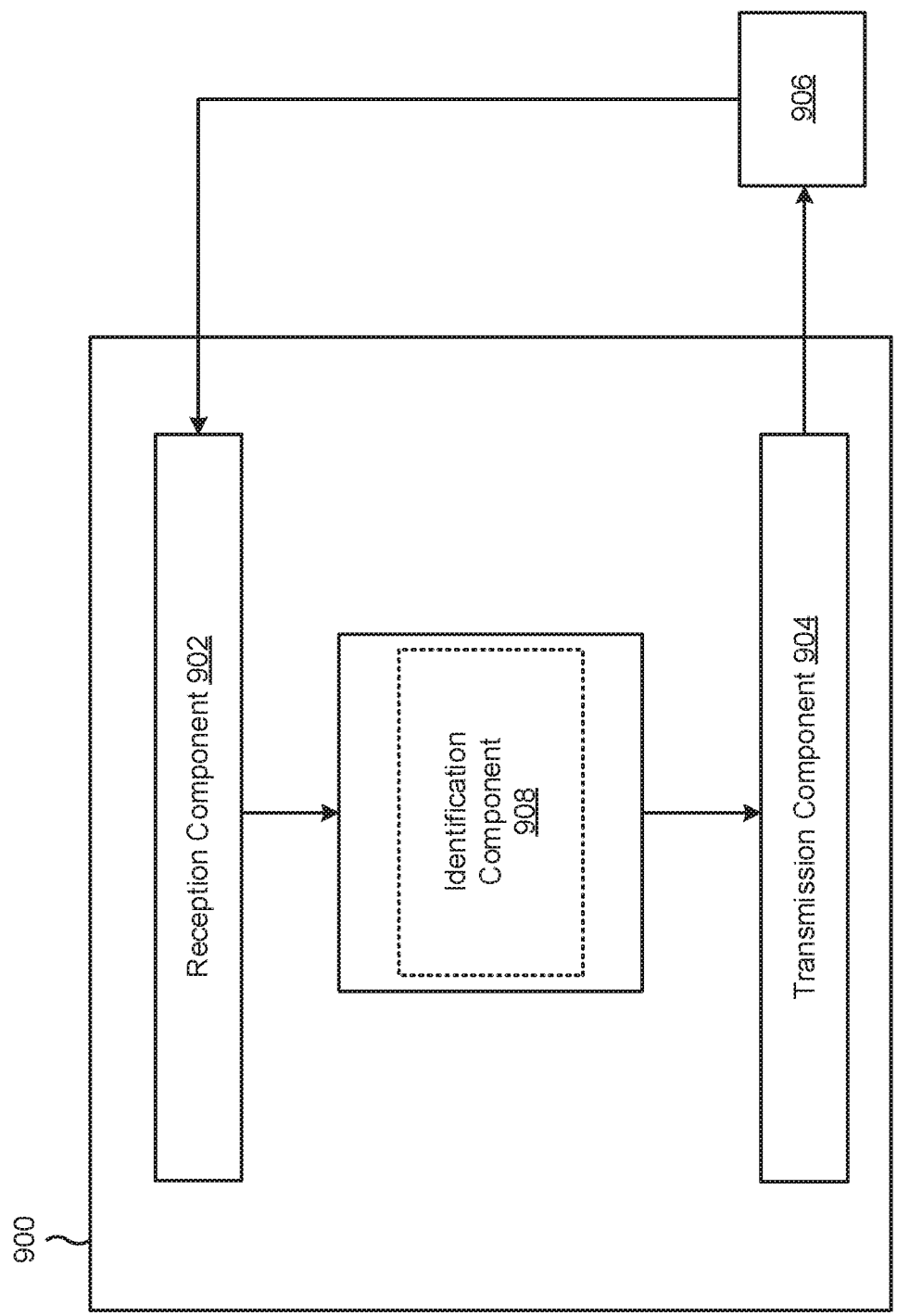
FIGS. 9 and 10 are block diagrams of example apparatuses for wireless communication, in accordance with various aspects of the present disclosure.

FIG. 9 is a block diagram of an example apparatus 900 for wireless communication. The apparatus 900 may be a wireless communication device (e.g., a base station or a UE), or a wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include an identification component 908, among other examples.

In some aspects, the apparatus 900 may be configured to perform one or more operations described herein in connection with FIGS. 3 and 6. Additionally or alternatively, the apparatus 900 may be configured to perform one or more processes described herein, such as process 400 of FIG. 4, process 700 of FIG. 7, or a combination thereof. In some aspects, the apparatus 900 and/or one or more components shown in FIG. 9 may include one or more components of the base station or the UE wireless described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the wireless communication device described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless communication device described above in connection with FIG. 2. In some aspects, the transmission component 904 may be co-located with the reception component 902 in a transceiver.

The identification component 908 may identify a plurality of cells associated with serving a UE. In some aspects, the identification component 908 may include one or more antennas, a demodulator, a MIMO detector, a receive processor, a modulator, a transmit MIMO processor, a transmit processor, a controller/processor, a memory, or a combination thereof, of the base station or the UE described above in connection with FIG. 2. The transmission component 904 may transmit an indication of the plurality of cells associated with serving the UE to another wireless communication device.

The identification component 908 may identify a plurality of cell groups associated with serving a UE. In some aspects, the identification component 908 may include one or more antennas, a demodulator, a MIMO detector, a receive processor, a modulator, a transmit MIMO processor, a transmit processor, a controller/processor, a memory, or a combination thereof, of the base station or the UE described above in connection with FIG. 2. The transmission component 904 may transmit an indication of the plurality of cell groups associated with serving the UE to another wireless communication device.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
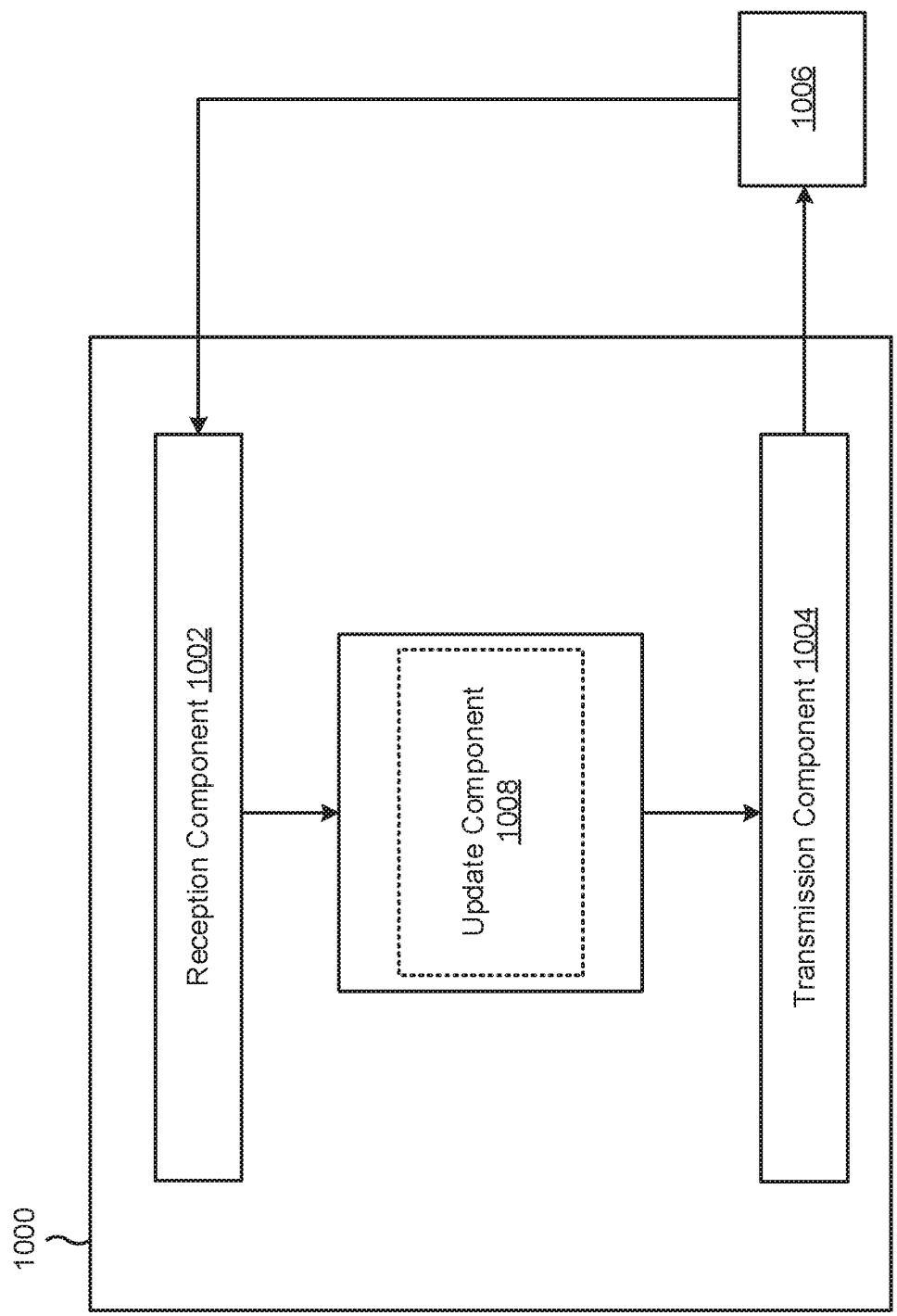

FIG. 10 is a block diagram of an example apparatus 1000 for wireless communication. The apparatus 1000 may be a wireless communication device (e.g., a base station or a UE), or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of an update component 1008, among other examples.

In some aspects, the apparatus 1000 may be configured to perform one or more operations described herein in connection with FIGS. 3 and 6. Additionally or alternatively, the apparatus 1000 may be configured to perform one or more processes described herein, such as process 500 of FIG. 5, process 800 of FIG. 8, or a combination thereof. In some aspects, the apparatus 1000 and/or one or more components shown in FIG. 10 may include one or more components of the base station or the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the wireless communication device described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the wireless communication device described above in connection with FIG. 2. In some aspects, the transmission component 1004 may be co-located with the reception component 1002 in a transceiver.

The reception component 1002 may receive an indication of a plurality of cells associated with serving a UE from another wireless communication device. The update component 1008 may update a list of serving cells of the UE based at least in part on the indication. In some aspects, the update component 1008 may include one or more antennas, a demodulator, a MIMO detector, a receive processor, a modulator, a transmit MIMO processor, a transmit processor, a controller/processor, a memory, or a combination thereof, of the base station or the UE described above in connection with FIG. 2.

The reception component 1002 may receive an indication of a plurality of cell groups associated with serving a UE from another wireless communication device. The update component 1008 may update a list of serving cell groups of the UE based at least in part on the indication. In some aspects, the update component 1008 may include one or more antennas, a demodulator, a MIMO detector, a receive processor, a modulator, a transmit MIMO processor, a transmit processor, a controller/processor, a memory, or a combination thereof, of the base station or the UE described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a second wireless communication device, comprising:
   receiving, from a first wireless communication device, an indication associated with whether a given cell of a plurality of cells is to be added to or removed from a list of cells that serve a user equipment (UE); and
   updating the list of cells based at least in part on the indication,
      wherein at least one of:
         when the given cell of the plurality of cells has is to be removed from the list of cells, the indication includes information indicating that the given cell is to be removed from the list of cells, or
         the indication is received via radio resource control signaling.

2. The method of claim 1, wherein the indication includes information that identifies the given cell.

3. The method of claim 2, wherein the information that identifies the given cell includes at least one of a serving cell identifier or a physical cell identifier.

4. The method of claim 1, wherein the indication includes a cell group identifier associated with a cell group of the given cell.

5. The method of claim 4, wherein the cell group is a primary cell group or a secondary cell group.

6. The method of claim 1, wherein the indication includes a cell type indicator associated with the given cell.

7. The method of claim 6, wherein the cell type indicator indicates whether the given cell is a primary cell, a secondary cell, or a primary secondary cell.

8. The method of claim 6, wherein the cell type indicator indicates whether the given cell is a physical uplink control channel (PUCCH) cell or a non-PUCCH cell.

9. The method of claim 1, wherein, when the given cell of the plurality of cells is to be added to the list of cells, the indication includes information indicating that the given cell is to be added to the list of cells.

10. The method of claim 1, wherein, when the given cell of the plurality of cells is to be removed from the list of cells, the indication includes information indicating that the given cell is to be removed from the list of cells.

11. The method of claim 1, wherein the information indicates whether each cell of the plurality of cells is to be added to or removed from the list of cells.

12. The method of claim 1, wherein the indication is received via the radio resource control signaling.

13. The method of claim 1, wherein the indication is received via a medium access control control element.

14. The method of claim 1, wherein the indication is received via downlink control information.

15. The method of claim 1, wherein the plurality of cells is a plurality of cell groups and the list of cells is a list of cell groups.

16. The method of claim 15, wherein the information indicating whether each cell of the plurality of cells is to be added to or removed from the list of cell groups.

17. The method of claim 16, wherein, when a given cell group of the plurality of cell groups is to be removed from the list of cell groups, the indication includes information indicating that the given cell group is to be removed from the list of cell groups.

18. The method of claim 16, wherein, when a given cell group of the plurality of cell groups is to be added to the list of cell groups that serve the UE, the indication includes information indicating that the given cell group is to be added to the list of cell groups.

19. The method of claim 1, wherein the first wireless communication device is a network node and the second wireless communication device is the UE.

20. The method of claim 1, wherein the first wireless communication device is the UE and the second wireless communication device is a network node.

21. A second wireless communication device for wireless communication, comprising:
   a memory; and
   one or more processors coupled to the memory, the one or more processors configured to:
      receive, from a first wireless communication device, an indication associated with whether a given cell of a plurality of cells is to be added to or removed from a list of cells that serve a user equipment (UE); and
      update the list of cells based at least in part on the indication,
         wherein at least one of:
            when the given cell of the plurality of cells is to removed from the list of cells, the indication includes information indicating that the given cell is to be removed from the list of cells, or
            the indication is received via radio resource control signaling.

22. The second wireless communication device of claim 21, wherein the indication includes at least one of:
   information identifying the given cell,
   a cell group identifier associated with a cell group of the given cell, or
   a cell type indicator associated with the given cell.

23. The second wireless communication device of claim 21, wherein, when the given cell of the plurality of cells is to be added to the list of cells, the indication includes information indicating that the given cell is to be added to the list of cells.

24. The second wireless communication device of claim 21, wherein the information indicates whether each cell of the plurality of cells is to be added to or removed from the list of cells.

25. The second wireless communication device of claim 21, wherein the indication is received via a medium access control control element.

26. The second wireless communication device of claim 21, wherein the indication is received via downlink control information.

27. The second wireless communication device of claim 21, wherein the first wireless communication device is a network node and the second wireless communication device is the UE.

28. The second wireless communication device of claim 21, wherein the first wireless communication device is the UE and the second wireless communication device is a network node.

29. A non-transitory computer-readable medium storing a set of instructions for wireless communication, the set of instructions comprising:
one or more instructions that, when executed by one or more processors of a second wireless communication device, cause the second wireless communication device to:
receive, from a first wireless communication device, an indication associated with whether a given cell of a plurality of cells is to be added to or removed from a list of cells that serve a user equipment (UE); and
update the list of cells based at least in part on the indication,
wherein at least one of:
when the given cell of the plurality of cells is to be removed from the list of cells, the indication includes information indicating that the given cell is to be removed from the list of cells, or
the indication is received via radio resource control signaling.

30. An apparatus for wireless communication, comprising:
means for receiving, from a first wireless communication device, an indication associated with whether a given cell of a plurality of cells is to be added to or removed from a list of cells that serve a user equipment (UE); and
means for updating the list of cells based at least in part on the indication,
wherein at least one of:
when the given cell of the plurality of cells is to be removed from the list of cells, the indication includes information indicating that the given cell is to be removed from the list of cells, or
the indication is received via radio resource control signaling.

* * * * *